United States Patent
Böhm et al.

(10) Patent No.: US 9,108,604 B2
(45) Date of Patent: Aug. 18, 2015

(54) METHOD FOR OPERATING A BRAKE SYSTEM FOR MOTOR VEHICLES, AND BRAKE SYSTEM

(71) Applicant: CONTINENTAL TEVES AG & CO. OHG, Frankfurt (DE)

(72) Inventors: Jürgen Böhm, Oberneisen (DE); Johann Jungbecker, Badenheim (DE); Stefan Drumm, Saulheim (DE); Marco Besier, Bad Schwalbach (DE); Harald Biller, Eschborn (DE); Zlatko Penzar, Frankfurt am Main (DE); Jochen Führer, Darmstadt (DE); Steffen Linkenbach, Eschborn (DE)

(73) Assignee: Continental Teves AG & Co. oHG (DE)

( * ) Notice: Subject to any disclaimer, the term of this patent is extended or adjusted under 35 U.S.C. 154(b) by 0 days.

(21) Appl. No.: 14/374,370

(22) PCT Filed: Jan. 25, 2013

(86) PCT No.: PCT/EP2013/051436
§ 371 (c)(1),
(2) Date: Jul. 24, 2014

(87) PCT Pub. No.: WO2013/113625
PCT Pub. Date: Aug. 8, 2013

(65) Prior Publication Data
US 2014/0368027 A1 Dec. 18, 2014

(30) Foreign Application Priority Data
Feb. 2, 2012 (DE) .......................... 10 2012 201 515

(51) Int. Cl.
*B60T 11/10* (2006.01)
*B60T 8/40* (2006.01)
(Continued)

(52) U.S. Cl.
CPC ............... *B60T 11/103* (2013.01); *B60T 7/042* (2013.01); *B60T 8/4081* (2013.01); *B60T 11/16* (2013.01); *B60T 17/18* (2013.01); *B60T 2270/404* (2013.01)

(58) Field of Classification Search
CPC ....... B60T 11/16; B60T 11/103; B60T 7/042; B60T 8/4081
USPC ............................ 303/3, 14–16, 113.4, 114.1
See application file for complete search history.

(56) References Cited

U.S. PATENT DOCUMENTS 6,425,644 B2 *  7/2002  Kawahata et al. ............. 303/122
6,957,870 B2 * 10/2005  Kagawa et al. ............. 303/113.4

(Continued)

FOREIGN PATENT DOCUMENTS

DE       101 14 599  A1   12/2001
DE   10 2006 059 949  A1   12/2007

(Continued)

OTHER PUBLICATIONS

International Search Report for PCT/EP2013/051436 mailed Jul. 2, 2013.

(Continued)

Primary Examiner — Thomas Irvin
(74) Attorney, Agent, or Firm — RatnerPrestia (57) ABSTRACT

A system and method for operating a brake system for motor vehicles, includes a master brake cylinder actuated by a brake pedal and separably connected to at least one hydraulically acutuatable wheel brake by at least one brake circuit, a hydraulically operable pedal travel simulator is connectable to the master brake cylinder, an electrically controllable pressure provision apparatus is separably connected to the brake circuit, and an electronic open-loop and closed-loop control unit. Upon brake pedal actuation, a pressure of the pressure provision apparatus is applied to the brake circuit in a first operating mode and the pressure of the master brake cylinder is applied to the brake circuit in a second operating mode. In the event of transition from the second operating mode to the first operating mode while the brake pedal is actuated, the actuation travel of the brake pedal is adjusted by electronic open-loop or closed-loop control.

14 Claims, 6 Drawing Sheets

(51) Int. Cl.
*B60T 17/18* (2006.01)
*B60T 7/04* (2006.01)
*B60T 11/16* (2006.01)

(56) References Cited

U.S. PATENT DOCUMENTS

| | | | |
|---|---|---|---|
| 7,431,407 B2 * | 10/2008 | Kamiya et al. | 303/114.3 |
| 7,478,887 B2 * | 1/2009 | Nakamura et al. | 303/113.4 |
| 7,533,944 B2 * | 5/2009 | Mizutani et al. | 303/113.4 |
| 7,861,523 B2 * | 1/2011 | Isono et al. | 60/552 |
| 8,152,244 B2 * | 4/2012 | Yanai et al. | 303/122.09 |
| 8,342,615 B2 * | 1/2013 | Drumm | 303/20 |
| 8,424,976 B2 * | 4/2013 | Dinkel et al. | 303/3 |
| 2011/0115282 A1 * | 5/2011 | Dinkel et al. | 303/3 |
| 2013/0147259 A1 * | 6/2013 | Linkenbach et al. | 303/14 |
| 2014/0028084 A1 * | 1/2014 | Biller et al. | 303/9.62 |
| 2014/0203626 A1 * | 7/2014 | Biller et al. | 303/10 |
| 2014/0225425 A1 * | 8/2014 | Drumm et al. | 303/9.75 |

FOREIGN PATENT DOCUMENTS

| | | | |
|---|---|---|---|
| DE | 10 2010 001 941 A1 | 8/2011 | |
| DE | 102011081461 A1 * | 1/2012 | B60T 13/66 |
| JP | 2007-69649 | 3/2007 | |
| WO | WO 2011/029812 A1 | 3/2011 | |

OTHER PUBLICATIONS

International Written Opinion for PCT/EP2013/051436 mailed Jul. 2, 2013 with English translation.
German Search Report for DE 10 2012 201 515.9 dated Mar. 13, 2012.

* cited by examiner

METHOD FOR OPERATING A BRAKE SYSTEM FOR MOTOR VEHICLES, AND BRAKE SYSTEM

CROSS REFERENCE TO RELATED APPLICATIONS

This application is the U.S. National Phase Application of PCT/EP2013/051436, filed Jan. 25, 2013, which claims priority to German Patent Application No. 10 2012 201 515.9, filed Feb. 2, 2012, the contents of such applications being incorporated by reference herein.

FIELD OF THE INVENTION

The invention relates to a method for operating a brake system and to a brake system for motor vehicles.

BACKGROUND OF THE INVENTION

In motor vehicle engineering, "brake-by-wire" brake systems are becoming ever more widespread. Such brake systems often comprise not only a master brake cylinder which can be actuated by the vehicle driver but also an electrically controllable pressure supply device by means of which the wheel brakes or the master brake cylinder is actuated in the "brake-by-wire" operating mode. In order to give the vehicle driver a pleasant pedal sensation in the "brake-by-wire" operating mode, the brake systems usually comprise a brake pedal sensation simulation device. In these brake systems, the wheel brake can also be actuated on the basis of electronic signals, without active involvement of the vehicle driver. These electronic signals can, for example, be output by an electronic stability program or a distance control system.

International patent application WO 2011/029812 A1, which is incorporated herein by reference, discloses a "brake-by-wire" brake system with a master brake cylinder which can be actuated by a brake pedal, a travel simulator and a pressure supply device. In a "brake-by-wire" operating mode pressure is applied to the wheel brakes by the pressure supply device. In a fallback operating mode, pressure is applied to the wheel brakes by means of the master brake cylinder which can be actuated by the brake pedal. In the application, no further details are given as to whether and, if appropriate, how a changeover can be carried out from the fallback operating mode into the "brake-by-wire" operating mode.

SUMMARY OF THE INVENTION

An aspect of the present invention is a method for operating a brake system and a brake system which provides the vehicle driver with a continuous brake pedal sensation, in particular even at a changeover from one operating mode into another operating mode of the brake system. In particular, the driver is to be provided with the accustomed brake pedal sensation and the "brake-by-wire" operating mode with boosted braking force as quickly and comfortably as possible in the case of a start or restart of the brake system.

An aspect of the invention is based on the concept that in the case of a changeover from the second operating mode into the first operating mode during actuation of the brake pedal adjustment of the actuation travel of the brake pedal is carried out under electronic open-loop or closed-loop control.

In the case of the changeover from the second operating mode into the first operating mode during actuation of the brake pedal the actuation travel of the brake pedal is preferably adjusted by discharging pressure medium, under electronic open-loop or closed-loop control, from the master brake cylinder or by feeding pressure medium into the master brake cylinder under electronic open-loop or closed-loop control.

According to one preferred embodiment of the method according to the invention, a first characteristic curve, which describes a relationship between a first and second variable in the first operating mode, and a second characteristic curve which describes a relationship between the first and second variables in the second operating mode, are predefined, and by comparing the current values of the first and second variables with the first characteristic curve and/or the second characteristic curve a decision is made as to whether pressure medium will be discharged or fed in. The actuation travel is particularly preferably adjusted to a value corresponding to the first characteristic curve.

The actuation travel is preferably reduced by feeding in pressure medium if the value pair composed of the first and second variables is below the second characteristic curve after the pedal travel simulator is activated, in order to compensate the pressure medium volume which has flowed off into the pedal travel simulator.

The actuation travel is preferably increased by discharging pressure medium if the value pair composed of the first and second variables is above the first characteristic curve after the pedal travel simulator is activated, in order to compensate the pressure medium excess volume originating from the wheel brake or brakes.

In the case of the changeover from the second operating mode into the first operating mode, the sensors for measuring the first and second variables are firstly preferably initialized and then the pedal travel simulator is switched on by means of the simulator release valve. Changes to the values of the first and second variable during the activation of the pedal travel simulator can therefore be observed and evaluated. After the activation of the pedal travel simulator, the driver is connected hydraulically both to the pedal travel simulator and to the brake circuit/circuits, with the result that a pressure equilibrium can be established. The adjustment of the actuation travel of the brake pedal is particularly preferably carried out after the activation of the pedal travel simulator.

The method is preferably carried out in a brake system with two or more brake circuits in which each brake circuit is connected to the master brake cylinder via a hydraulic connecting line with an isolating valve which is advantageously open in the currentless state, and to the pressure supply device via a further hydraulic connecting line with an activation valve which is advantageously closed in the currentless state.

The brake system preferably also comprises a wheel brake pressure modulation unit which has, per wheel brake, an inlet valve and an outlet valve for setting a wheel-specific brake pressure which is derived from the pressure in the brake circuit. In the non-activated state, the inlet valves particularly preferably pass on the respective brake circuit pressures. The outlet valves are likewise blocked in the non-activated state.

According to one development of the method according to the invention, the actuation travel of the brake pedal is reduced in that an activation valve which is arranged between the pressure supply device and the brake circuit is opened, and the pressure supply device is activated in such a way that pressure medium volume is forced into the master brake cylinder. The pressure supply device is therefore connected to the brake circuit and thus to the master brake cylinder, with the result that pressure medium can then be conducted into the master brake cylinder via the opened activation valve and the open connection between the brake circuit and the master brake cylinder by means of the pressure supply device, as a result of which the pedal position is corrected and/or the actuation travel of the brake pedal is adjusted. The actuation travel is particularly preferably adjusted if the value pair composed of the first and second variables is below the second characteristic curve after the activation of the pedal travel simulator.

According to one development of the method according to the invention, the actuation travel of the brake pedal is increased in that an outlet valve which is arranged between a wheel brake and a pressure medium reservoir container is opened. As a result, the pressure medium excess volume originating from the wheel brake/brakes can flow off into the pressure medium reservoir container. The actuation travel is particularly preferably adjusted if the value pair composed of the first and second variable is above the first characteristic curve after the activation of the pedal travel simulator.

The pressure supply device is preferably formed by a cylinder-piston arrangement whose piston can be actuated by means of an electromechanical actuator.

According to one preferred embodiment of the method according to the invention, in addition, advantageously simultaneously, an activation valve which is arranged between the pressure supply device and the brake circuit is opened in order to open the outlet valve. It is therefore possible for pressure equalization to take place between the components comprising the pressure supply device, the brake circuit or circuits and the master brake cylinder. Particularly preferably the piston of the pressure supply device is additionally, advantageously simultaneously, set to a predetermined piston position. The piston is then located at the correct position for the first operating mode. The predetermined piston position can be determined easily according to a predefined piston position pressure characteristic curve, wherein the currently measured first variable is taken into account.

After the adjustment of the actuation travel of the brake pedal an isolating valve which is arranged between the master brake cylinder and the brake circuit is preferably closed, and then a predetermined setpoint pressure is set by the pressure supply device. The brake system is then in the first operating mode, wherein the driver experiences the accustomed brake pedal sensation. The setpoint pressure is particularly preferably determined on the basis of the current values of the first and second variables.

According to one preferred development of the method according to the invention, the actuation travel of the brake pedal is not adjusted if the current value of the second variable is lower than a predefined first threshold value. In these cases, the actuation of the brake pedal by the driver is so small that deviations from the accustomed brake pedal sensation are not disruptive. In addition to the current value of the second variable the current value of the first variable is particularly preferably used. The actuation travel of the brake pedal is then not adjusted if the current value of the second variable is lower than the predefined first threshold value and the current value of the first variable is lower than a predefined second threshold value.

The brake system is preferably a brake system for motor vehicles which can be activated in a so-called "brake-by-wire" operating mode either by the vehicle driver or independently of the vehicle driver, is preferably operated in the "brake-by-wire" operating mode and can be operated in at least one fallback operating mode in which only the operation by the vehicle driver is possible.

An aspect of the invention also relates to a brake system in whose open-loop and closed-loop control unit adjustment of the actuation travel of the brake pedal is carried out in the case of a changeover from the second operating mode into the first operating mode during actuation of the brake pedal. Furthermore, the invention relates to a brake system in whose electronic open-loop and closed-loop control unit a method according to the invention is carried out.

BRIEF DESCRIPTION OF THE FIGURES

Further preferred embodiments of the invention can be found in the dependent claims and the following description with reference to figures.

In the drawings, in each case in schematic form.

DETAILED DESCRIPTION OF THE INVENTION

Figure 1:
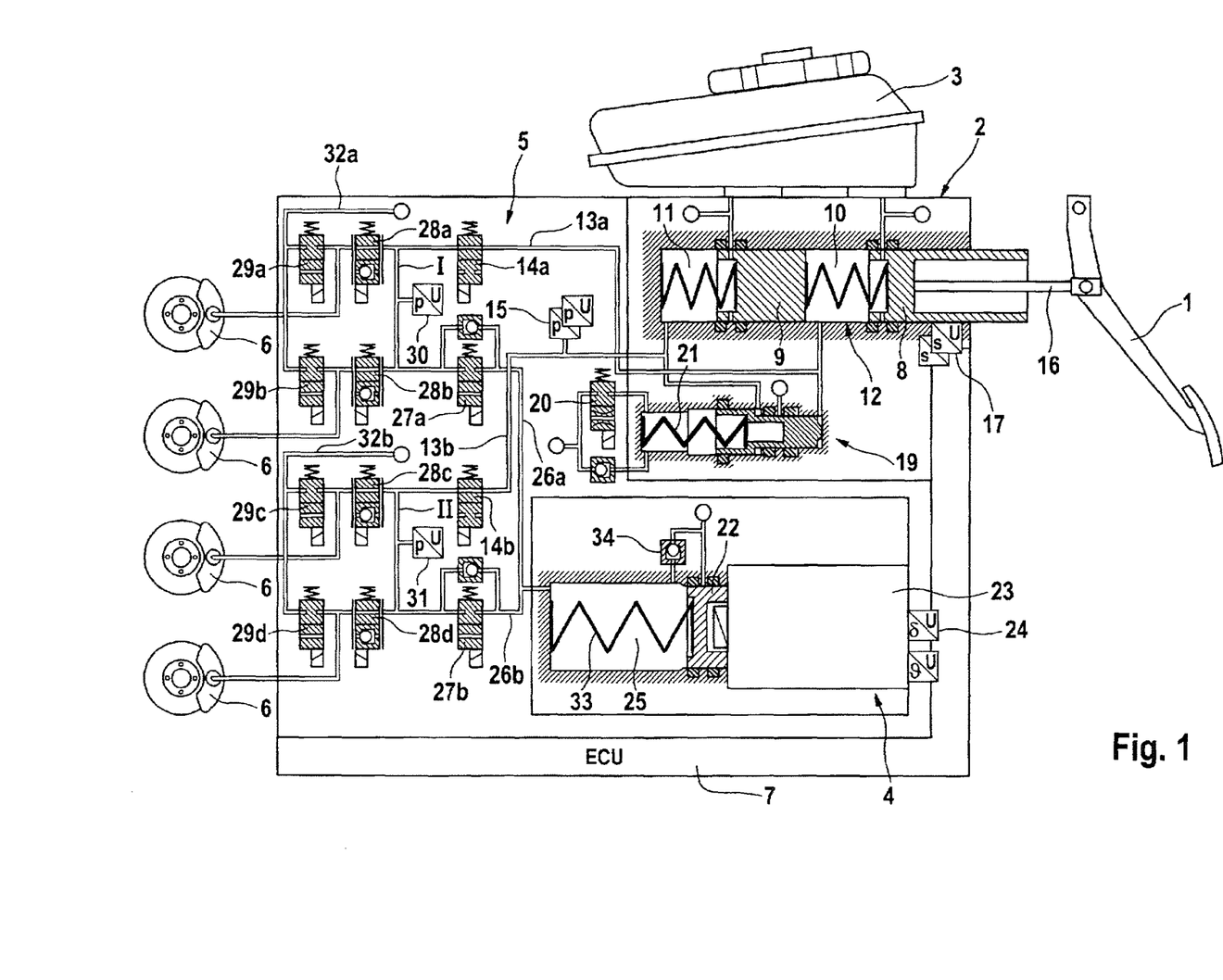
FIG. 1 shows an exemplary brake system.

FIG. 1 is a schematic illustration of an exemplary brake system. The brake system comprises an actuation device 2 which can be actuated by a vehicle driver by means of an actuation pedal or brake pedal 1, a pressure medium reservoir container 3 which is assigned to the actuation device 2, an electrically controllable pressure supply device 4, an electrically controllable pressure modulation device 5 to whose output connections wheel brakes 6 of a motor vehicle (not illustrated) are connected, and an electronic open-loop and closed-loop control unit 7 (ECU; electronic control unit) which serves to process sensor signals and to activate the electrically controllable components.

The actuation device 2 comprises a dual-circuit master brake cylinder or tandem master cylinder 12 with two hydraulic pistons 8, 9 which are arranged in series in a (master brake cylinder) housing and which bound hydraulic pressure chambers 10, 11. The pressure chambers 10, 11 are connected to the pressure medium reservoir container 3 via radial bores which are formed in the pistons 8, 9, wherein these bores can be shut off by means of a relative movement of the pistons 8, 9 in the housing. Furthermore, each pressure chamber 10, 11 is connected to a brake circuit I, II, each with two wheel brake circuits with hydraulically actuable wheel brakes 6, by means of a hydraulic line 13a, 13b. An isolating valve 14a, 14b, which is embodied as an electrically actuable 2/2 way valve, which is preferably open in the currentless state, is inserted into each of the hydraulic lines 13a, 13b. A pressure sensor which is connected to the pressure chamber 11 and is preferably of a redundant design detects the pressure $P_{THZ}$ which is built up in the pressure chamber 11 by moving the second piston 9 and which corresponds to the pedal force generated by the driver. Furthermore, the pressure chambers 10, 11 receive restoring springs (not denoted in more detail) which prestress the pistons 8, 9 counter to the actuation direction. A piston rod 16 which is coupled to the brake pedal 1 interacts with the first (master cylinder) piston 8, wherein a variable $S_{Pedal}$ which characterizes the actuation travel of the brake pedal 1, for example the actuation travel or actuation angle of the brake pedal 1 itself or the actuation travel of the piston 8 which is coupled to the brake pedal, is detected by a travel sensor 17 which is preferably of redundant design.

The actuation device 2 also comprises a pedal travel simulator (also referred to as pedal sensation simulator device) 19 which interacts with the master brake cylinder 12 and gives the vehicle driver a pleasant pedal sensation in a first operating mode (a so-called "brake-by-wire" operating mode). The pedal travel simulator 19 can be actuated hydraulically and is connected to at least one pressure chamber 10, 11 of the master brake cylinder 12. The pedal travel simulator 19 can be activated and deactivated by means of an electrically actuable simulator release valve 20.

The pedal travel simulator 19 is composed for example essentially from two simulator chambers, a simulator spring chamber with a simulator spring 21 and a simulator piston (stepped piston) which separates these chambers from one another. In this context, the simulator chambers are each connected to a pressure chamber 10, 11 of the master brake cylinder 12, while the simulator spring chamber can be connected to the pressure medium reservoir container 3 with intermediate connection of the simulator release valve 20. A non-return valve which is connected in parallel with the simulator release valve 20 is connected to the simulator spring chamber and permits a largely unthrottled flow of the pressure medium into the simulator spring chamber independently of the switch state of the simulator release valve 20 and independently of a throttling effect of the hydraulic simulator outlet connections. The simulator release valve 20 is embodied as an electrically actuable 2/2 way valve which is preferably closed in the currentless state.

The electrohydraulic pressure supply device 4 is embodied as a hydraulic cylinder-piston arrangement whose piston 22 can be actuated by a schematically indicated electric motor 23 with the intermediate connection of a rotational-translational gear mechanism (not illustrated). The electric motor 23 and the rotational-translational gear mechanism form a linear actuator, wherein, in order to detect a variable which is characteristic of the position of the piston 22 of the pressure supply device 4, a sensor 24 is present which is embodied for example as a rotor position sensor 24 which serves to detect the rotor position of the electric motor 23. Further sensors such as for example a temperature sensor supply the electronic open-loop and closed-loop control unit 7 with state information on the electric motor 23 or the linear actuator. The piston 22 bounds a pressure chamber 25 which can be connected to the brake circuits I, II via hydraulic lines 26a, 26b, each with an electrically actuable activation valve 27a, 27b. In this context, in each case a non-return valve, which closes toward the pressure chamber 25, is connected in parallel with the activation valves 27a, 27b. Furthermore, the pressure chamber 25 is connected to the pressure medium reservoir container 3 via a non-return valve 34 which closes toward said pressure medium reservoir container 3. The activation valves 27a, 27b are embodied as electrically actuable 2/2 way valves which are preferably closed in the currentless state. Arranged in the pressure chamber 25 is a spring 33 which loads the piston 22 counter to the pressure build-up direction.

In order to modulate the pressure at the wheel brakes 6, the hydraulic pressure modulation device 5 comprises, per wheel brake 6, for example an inlet valve 28a-28d and an outlet valve 29a-29d. The input connections of the inlet valves 28a-28d or the brake circuits I, II can be supplied with the pressure of the master brake cylinder 12 (via the lines 13a, 13b with the isolating valves 14a, 14b) or with the pressure of the pressure supply device 4 (via the lines 26a, 26b with the activation valves 27a, 27b). The output connections of the outlet valves 29a-29d are connected via return lines 32a, 32b to the pressureless pressure medium reservoir container 3 (so-called open system). In addition it is also to be noted that all the circular symbols represent hydraulic lines leading to the pressure medium reservoir container 3. The inlet valves 28a-28d are advantageously embodied as electrically actuable pressure regulating valves, which are open in the currentless state, and the outlet valves 29a-29d are embodied as electrically actuable 2/2 way valves, which are closed in the currentless state.

For example, a pressure sensor 30, 31 for detecting the pressure present at the input connections of the associated inlet valves 28a, 28b; 28c, 28d is arranged in each brake circuit I, II. Alternatively it is conceivable that a pressure sensor is arranged in just one of the two brake circuits I, II or that a pressure sensor is arranged in the line 26a, 26b between the pressure chamber 25 and the activation valves 27a, 27b. By means of this pressure sensor or these pressure sensors it is possible to determine the pressure $P_{act}$ of the pressure supply device 4 (when the isolating valves 14a, 14b are closed).

In a first operating mode $Z_A$ (a so-called "brake-by-wire" operating mode with boosting of the braking force) the pressure of the pressure supply device 4 is applied to the brake circuits I, II. For this purpose, for example the activation valves 27a, 27b are opened, with the result that the pressure supply device 4 is connected hydraulically to the brake circuits I, II. The master brake cylinder 12 is disconnected from the brake circuits I, II or wheel brakes 6 by means of the closed isolating valves 14a, 14b. The simulator release valve 20 is opened, with the result that the pedal travel simulator 19 is activated or switched on. In the case of actuation $S_{Pedal}$ of the brake pedal 1, pressure medium volume is forced out of the pressure chambers 10, 11 of the master brake cylinder 12 into the simulator chambers of the pedal travel simulator 19. The pressure supply device 4 is activated by means of the electronic open-loop and closed-loop control unit 7 in order to supply a setpoint pressure $P_{Setp}$ to be applied to the brake circuits I, II. The value for the setpoint pressure $P_{Setp}$ of the pressure supply device 4 is calculated, for example in the electronic open-loop and closed-loop control unit 7, on the basis of a predefined braking force boosting function and the driver's braking request ($S_{Pedal}$, $P_{THZ}$) which is determined, for example, by means of the sensors 15 and 17.

For example, the setpoint pressure $P_{Setp}$ is determined from the measured variables $P_{THZ}$ and $S_{Pedal}$ according to the following formula:

$$P_{Setp} = \lambda_S * f_S(S_{Pedal}) + \lambda_P * f_P(P_{THZ})$$

where:
$f_S$: is the brake pressure boosting function in dependence on the pedal travel $S_{Pedal}$,
$f_P$: is the brake pressure boosting function in dependence on the pressure $P_{THZ}$,
$\lambda_S$: is the weighting factor or weighting function for the pressure component $f_S$, and
$\lambda_P$: is the weighting factor or weighting function for the pressure component $f_P$.

The setpoint pressure $P_{Setp}$ is therefore determined by weighted superimposition of a pressure component $f_S$, based on the pedal/piston travel variable $S_{Pedal}$ and of a pressure component $f_P$ based on the pressure variable $P_{THZ}$. The weighting factors can each assume for example values between zero and one. Specific adaptation of the setpoint pressure calculation to the present brake system and the requests relating to the configuration of the brake system is possible by virtue of the corresponding predefinition or definition and parameter selection with respect to the predefined brake pressure boosting functions $f_S$, $f_P$ and the predefined weighting factors $\lambda_S$, $\lambda_P$.

In a second operating mode $Z_P$ (a so-called fallback operating mode), the pressure of the master brake cylinder 12 is applied to the brake circuits I, II. For this purpose, the isolating valves 14a, 14b are opened, with the result that the master brake cylinder 12 is hydraulically connected to the brake circuits I, II. The pressure supply device 4 is disconnected from the brake circuits I, II or wheel brakes 6 by means of the closed activation valves 27a, 27b. The simulator release valve 20 is closed, with the result that the pedal travel simulator 19 is switched off. In the case of actuation $S_{Pedal}$ of the brake pedal 1, pressure medium volume is forced out of the pressure chambers 10, 11 of the master brake cylinder 12 into the brake circuits I, II or wheel brakes 6.

Figure 2:
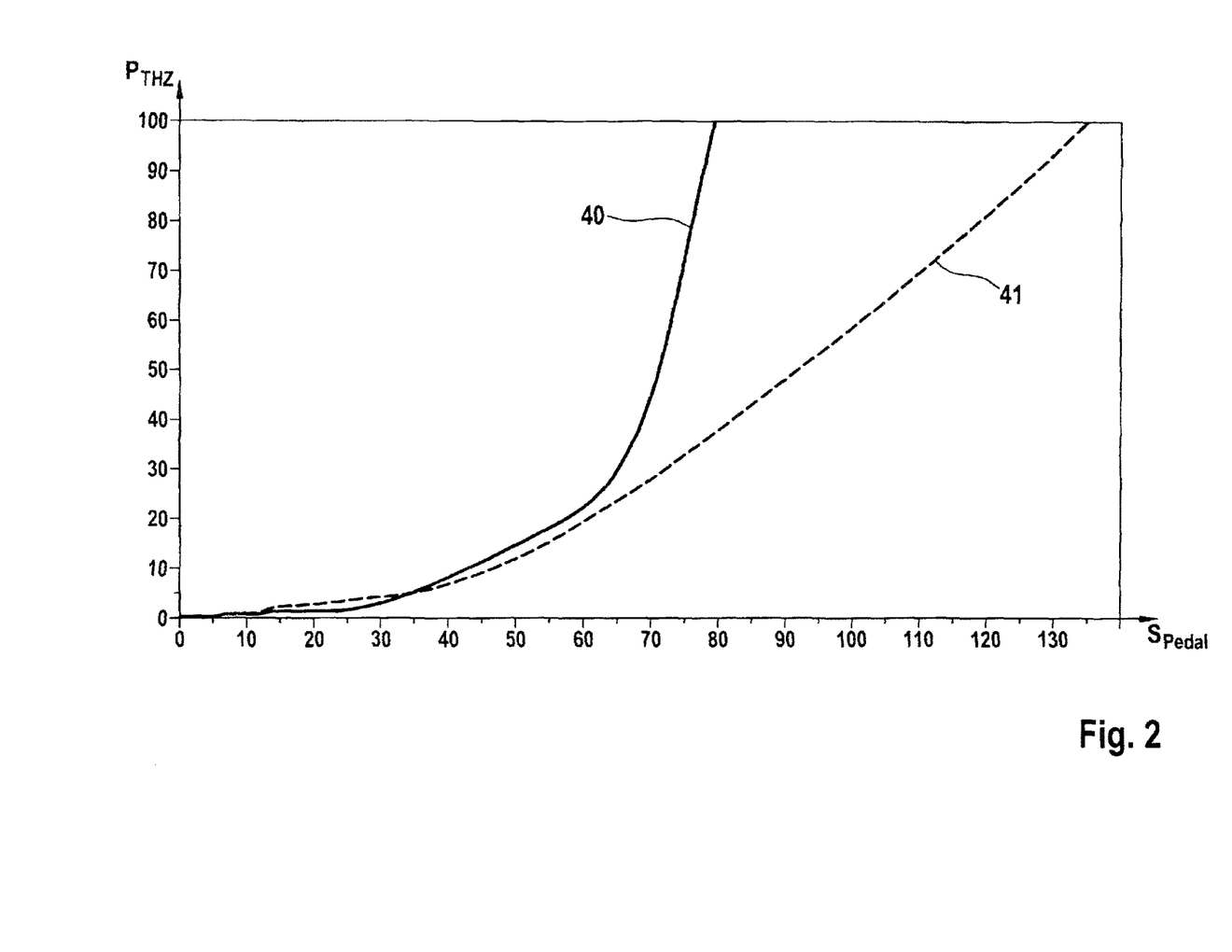
FIG. 2 shows exemplary relationships between the pressure in the master brake cylinder and the actuation travel of the brake pedal for two different operating modes of the exemplary brake system from FIG. 1.

FIG. 2 is a schematic illustration of exemplary relationships between the pressure $P_{THZ}$ in the master brake cylinder 12 and the associated actuation travel $S_{Pedal}$ for the two operating modes $Z_A$, $Z_P$. The pressure $P_{THZ}$ is plotted against the actuation travel $S_{Pedal}$, wherein the characteristic curve 40 represents the first operating mode $Z_A$ and the characteristic curve 41 represents the second operating mode $Z_P$. Characteristic curves 40 and 41 represent the nominal relationship between the pressure $P_{THZ}$ and the actuation travel $S_{Pedal}$ in the respective operating mode $Z_A$ and $Z_P$, respectively. For example, corresponding characteristic curves 40, 41 are stored for the two operating modes $Z_A$, $Z_P$ in the electronic open-loop and closed-loop control unit 7.

The nominal pedal characteristic curve of the brake system in the first operating mode $Z_A$, i.e. the relationship between the pedal force and the pedal travel $S_{Pedal}$, is determined essentially by the simulator spring 21 (preferably a progressive compression spring, other spring elements are conceivable, for example an elastomer spring) of the pedal travel simulator 19. The displacement volume of the pedal travel simulator 19 depends linearly on the pedal travel $S_{Pedal}$. Likewise, the pedal force and the pressure in the pedal travel simulator 19 are in a linear relationship. Correspondingly, a characteristic curve 40 is produced which describes the pressure in the pedal travel simulator 19, which corresponds to the pressure $P_{THZ}$ which can be measured by means of the pressure sensor 15, as a function of the pedal travel $S_{Pedal}$. This nominal characteristic curve 40, which represents the normal braking function ("brake-by-wire" operating mode, first operating mode $Z_A$), is stored in the electronic open-loop and closed-loop control unit 7.

In the hydraulic fallback level (second operating mode $Z_P$), the valves, in particular the valves 14a, 14b, 20, 27a, 27b, are currentless, and the driver is directly connected hydraulically to the wheel brakes 6 when the brake pedal 1 is actuated. In accordance with the hydraulic configuration of the brake system and of the vehicle-specific volumetric capacity of the wheel brakes 6, therefore a different pedal characteristic curve is produced and the relationship between the pressure $P_{THZ}$, which can be measured by means of the pressure sensor 15, and the pedal travel $S_{Pedal}$ is described by the characteristic curve 41. This nominal characteristic curve 41, which represents the second operating mode $Z_P$, is also stored in the electronic open-loop and closed-loop control unit 7. As is apparent from FIG. 2, the characteristic curves of the two operating modes $Z_P$ and $Z_A$ are significantly different.

Figure 3:
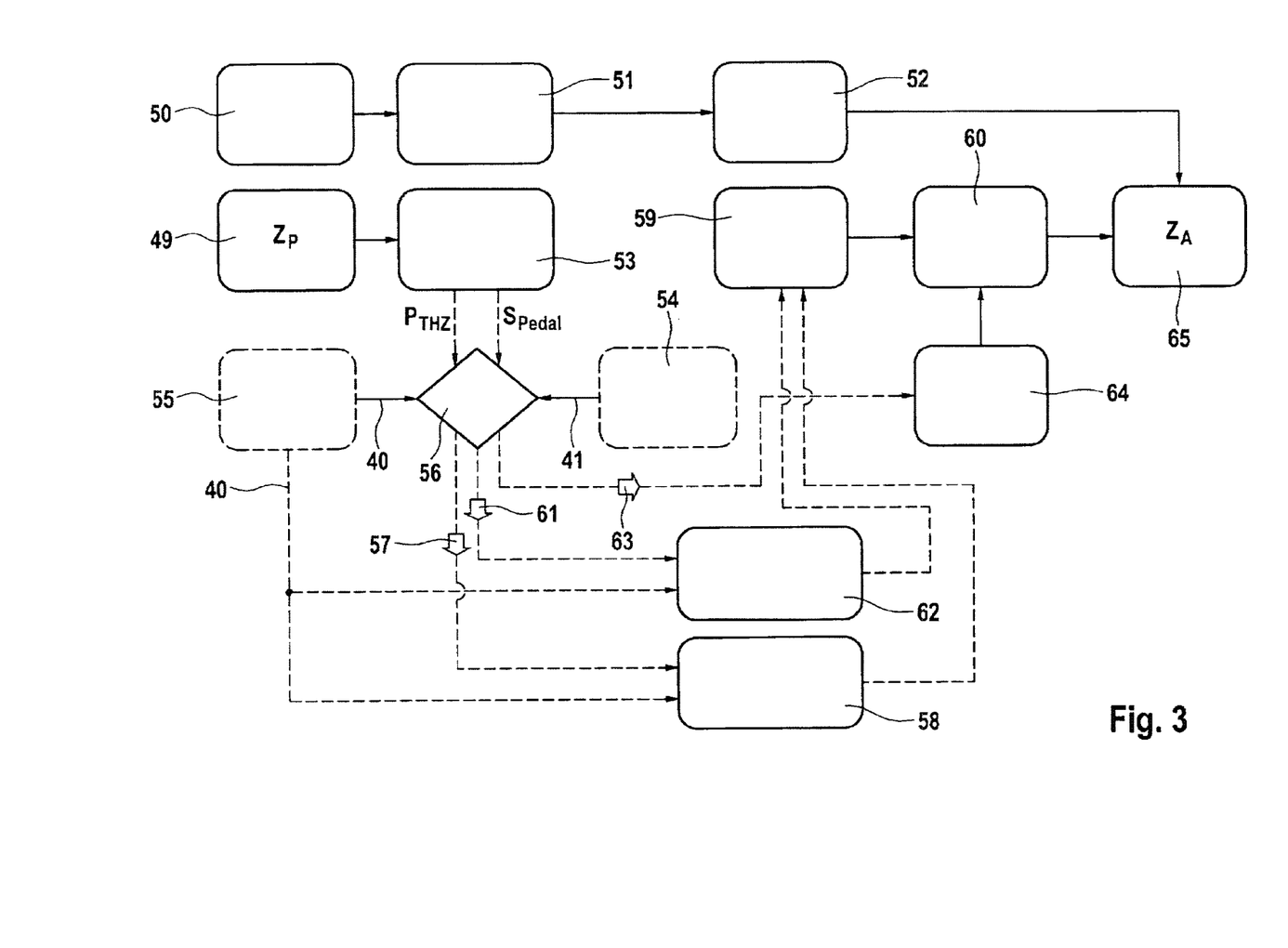
FIG. 3 shows a schematic flowchart illustrating an exemplary method for operating the exemplary brake system from FIG. 1.

FIG. 3 illustrates a schematic flowchart showing an exemplary method for operating a brake system.

If the vehicle is firstly shut down or the brake system is not supplied with electrical energy, the brake system is in a passive or shut-down state 50 (assuming no actuation of the brake pedal by the driver). The brake system is usually started, for example, by the driver by switching on the engine ignition or in advance by opening the driver's door (optionally by means of a corresponding surroundings sensor system, for example keyless entry). Firstly, in block 51, the sensors for the brake system, for example the pressure sensors 15, 30, 31 and the position sensors 17, 24 are initialized, with the result that they provide measured values after the initialization. In block 52, the corresponding valves, for example the isolating valves 14a, 14b, the simulator release valve 20 and the activation valves 27a, 27b, as well as the brake boosting function, are activated, with the result that in the case of actuation of the brake pedal by the driver a "brake-by-wire" braking operating can be carried out. The brake system is then in an operationally ready active state (first operating mode $Z_A$, block 65), in which, when the brake pedal 1 is actuated, the isolating valves 14a, 14b Of the actuation device 2 are closed, and the simulator release valve 20 and the activation valves 27a, 27b of the pressure supply device 4 are opened. The driver is then not directly connected hydraulically to the brake circuits I, II or wheel brakes 6 but rather actuates the pedal travel simulator 19 while the pressure $P_{Setp}$ is applied (in accordance with a predefined brake force boosting function) to the brake circuits I, II by the pressure supply device 4. The initialization path without actuation by the driver (blocks 50, 51, 52, 65) is generally the usual case, i.e. the valves 14a, 14b, 20, 27a, 27b are energized directly and the pressure supply device 4 is activated.

If the vehicle is shut down (or if the brake system is not supplied with electrical energy) and the driver actuates the brake pedal 1, the brake system is in the second operating mode $Z_P$ (fallback operating mode). If the engine ignition is then switched on (or if the brake system is supplied with electrical energy again), the brake system is changed over into the first operating mode $Z_A$ (block 65), in accordance with the exemplary method described below, wherein an advantage of the method is that the changeover is carried out as comfortably as possible and without distracting the driver.

In the text which follows, for example the two following cases are differentiated:

The first case relates to the situation in which the driver actuates the brake pedal during a passive state or switched-off state and then the brake system is started or initialized while the driver actuates the brake pedal further. This corresponds, for example, to the case in which the driver is seated in the shut-down vehicle, actuates the brake pedal and then switches on the ignition. In order to illustrate the first case, an exemplary diagram of the pedal travel $S_{Pedal}$ and the associated pressure $P_{THZ}$ is illustrated in FIG. 4.

Figure 4:
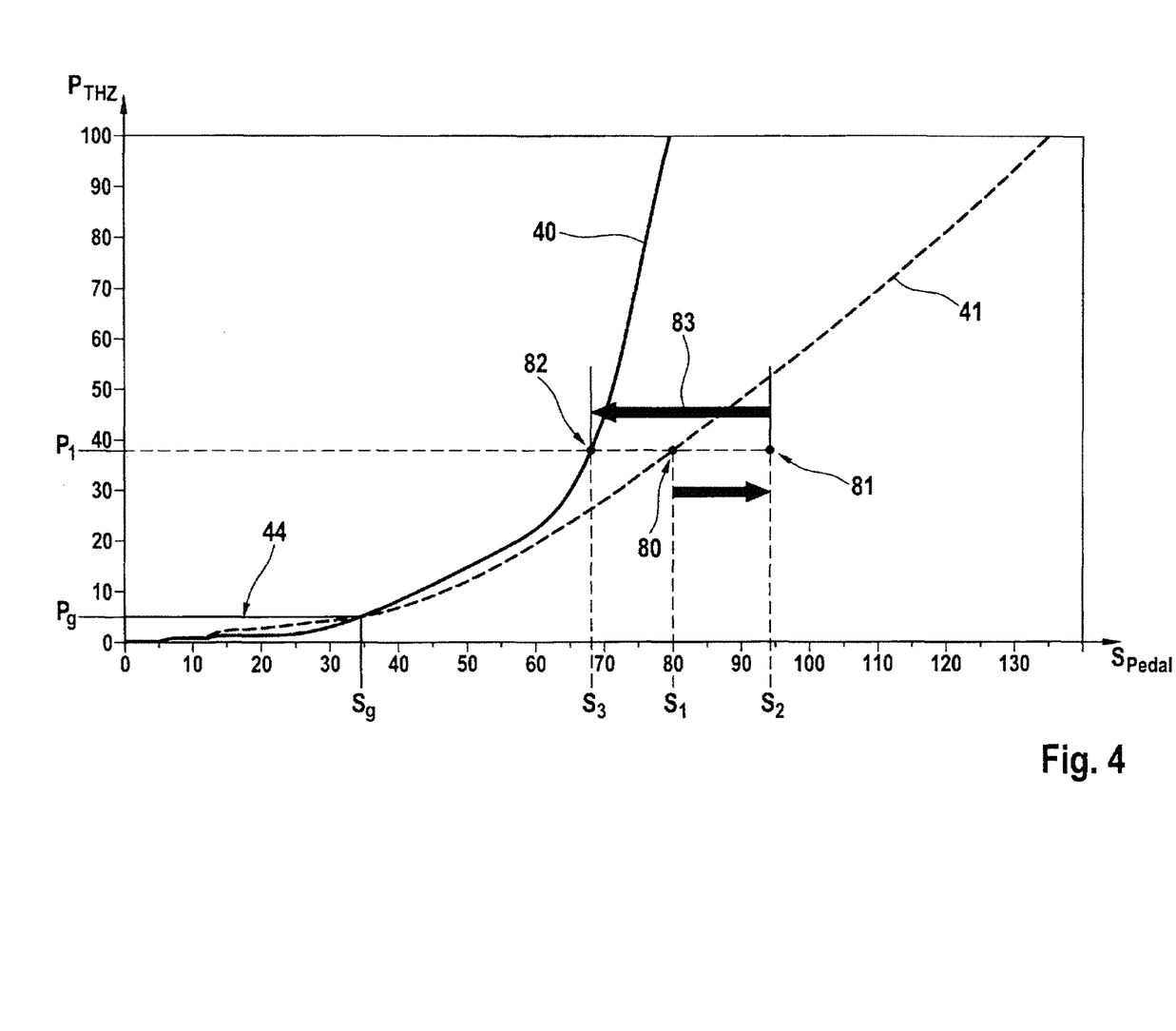
FIG. 4 shows a diagram of the pedal travel and the associated pressure illustrating a first exemplary method.

If the driver therefore actuates the brake pedal during a passive or switched-off state (i.e. without previous initialization of the brake system), the brake system is in the second operating mode $Z_P$ (fallback operating mode) and the characteristic curve 41 of FIG. 4 is active. The pedal travel $S_{Pedal}$ and the associated system pressure in the brake circuits I, II, which corresponds to the pressure $P_{THZ}$ of the master brake cylinder 12 owing to the opened isolating valves 14a, 14b, set themselves to the point 80 ($S_1$, $P_1$) in accordance with the volumetric capacity of the wheel brakes 6 and the pedal force applied by the driver. If the brake system is then started, for example by the driver by means of the engine ignition, the sensors and the ECU 7 of the brake system are firstly initialized in block 53 of FIG. 3, with the result that measured values of the pressure sensor 15 for the pressure $P_{THZ}$ and measured values of the travel/position sensor 17 for the pedal travel $S_{Pedal}$ are subsequently available. Then, in block 53, the simulator release valve 20 is opened, with the result that the pedal travel simulator 19 is actuated. The valves 14a, 14b, 27a, 27b firstly remain currentless. As a result of the activation of the pedal travel simulator 19, the pedal travel $S_{Pedal}$ becomes longer while the pedal force applied by the driver remains the same (i.e. constant pressure $P_1$ in FIG. 4) by the capacity of the pedal travel simulator 19, i.e. the pedal travel is lengthened from $S_1$ to $S_2$ in FIG. 4.

The position of the point 81 ($S_2$, $P_1$), which is set, relative to the two nominal characteristic curves 40, 41 is checked in block 56 by plausibility checking and a comparison on the basis of the current measured values of the sensors 15 and 17 ($P_{THZ}$ and $S_{Pedal}$) as well as the characteristic curve 41, stored in block 54, for the second operating mode $Z_P$ and the characteristic curves 40, stored in block 55, for the second operating mode $Z_A$. If it is detected in block 56 that the point 81 ($S_2$, $P_1$) which is set is below the two nominal characteristic curves 40, 41, an active pedal correction, for example by means of the pressure supply device 4, is carried out (branch 57 to block 58).

For this purpose, in block 58 the activation valves 27a, 27b are preferably firstly opened, with the result that the pressure supply device 4 is connected hydraulically to the brake circuits I, II and therefore also to the master brake cylinder 12. In block 58, the pressure supply device 4 is further activated in such a way that pressure medium volume is forced from the pressure supply device 4 into the pressure chambers 10, 11 of the master brake cylinder 12 via the opened activation valves 27a, 27b and isolating valves 14a, 14b, with the result that the brake pedal 1 is reset counter to the acting pedal force of the driver, i.e. constant pressure $P_1$. The resetting of the brake pedal 1 (the pedal correction travel) is illustrated in FIG. 4 by the arrow 83. The brake pedal 1 is set to the nominal point 82 of the characteristic curve 40 of the first operating mode $Z_A$ ("brake-by-wire" operating mode), with the result that the pedal position which is set corresponds to the pedal travel $S_3$, obtained from the characteristic curve 40, for the (system) pressure $P_1$. The pedal position is checked by means of the sensor 17.

After the ending of the pedal correction (block 58), in block 59 the master brake cylinder 12 is disconnected from the brake circuits I, II by closing the isolating valves 14a, 14b. In block 60, the boosting of the braking force is then slowly increased until the brake system is then in the first operating mode $Z_A$ ("brake-by-wire" operating mode with boosting of the brake force) in block 65.

As a result of the procedure described above with brake pedal correction, the brake system is changed over from the second operating mode into the first operating mode quickly, comfortably and without distracting the driver during actuation of the brake pedal. In particular, the pedal correction changes over the brake system almost imperceptibly for the driver from the state at the point 81 into the "brake-by-wire" operating state which corresponds to the point 82 on the characteristic curve 40 of the first operating mode, to which the driver is accustomed.

The second case relates to the situation in which the driver actuates the brake pedal in the "brake-by-wire" operating mode, and the brake system goes into the fallback operating mode (for example owing to a brief power failure of the brake system) and then a restart or initialization of the brake system is carried out while the driver continues to apply pressure to the brake pedal. In order to illustrate the second case, FIG. 5 illustrates an exemplary diagram for the pedal travel $S_{Pedal}$ and the associated pressure $P_{THZ}$.

If the brake system is restarted during a "brake-by-wire" braking operation initiated by actuation of the brake pedal, with boosting of the braking force (for example caused by a brief power failure), all the valves, in particular the valves 14a, 14b, 20, 27a, 27b as well as the pressure supply device 4 of the brake system are without an electrical power supply, i.e. currentless, for a limited time. The brake system is therefore reset from the first operating mode with actuation by the driver into the hydraulic fallback level, i.e. into the second operating mode $Z_P$ in the case of actuation by the driver.

Figure 5:
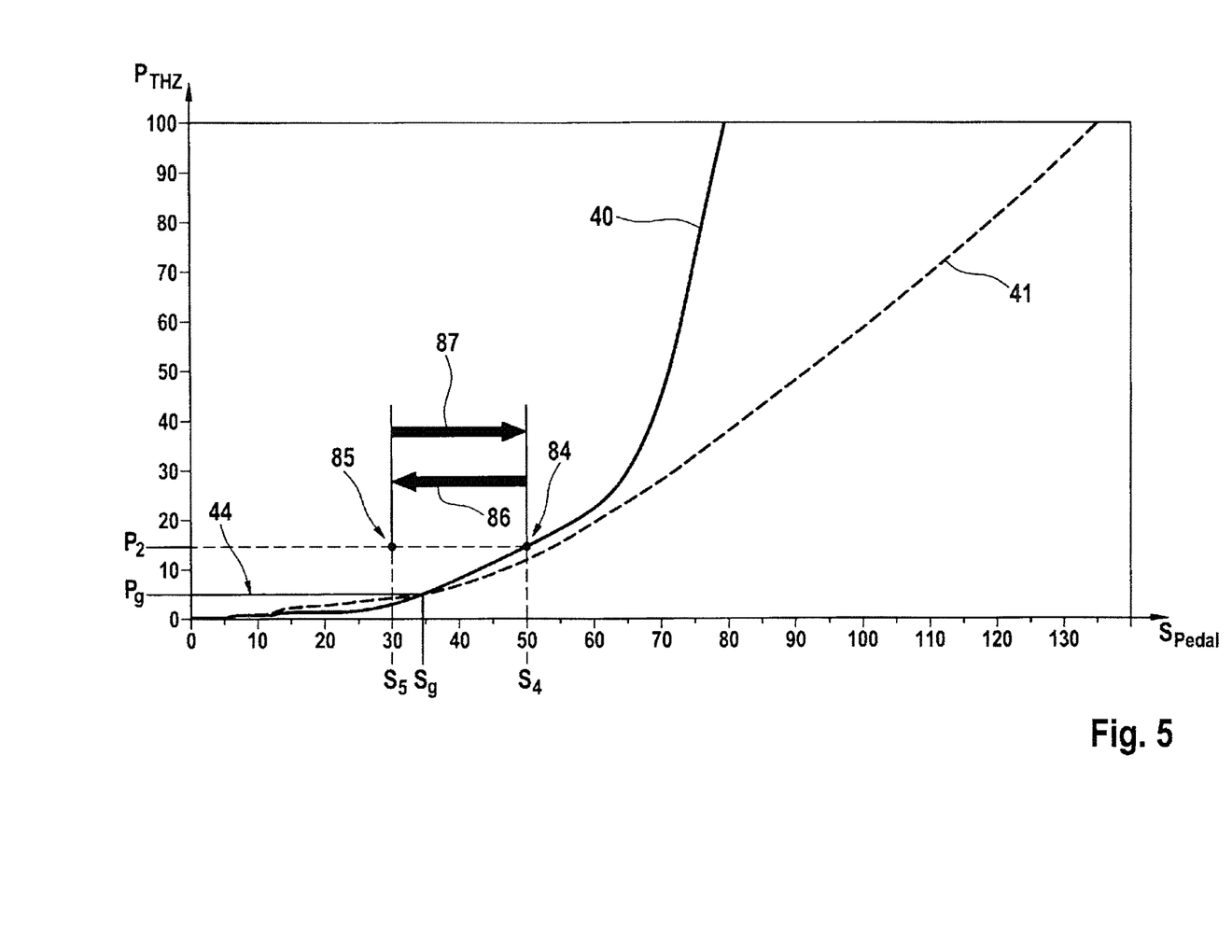
FIG. 5 shows a diagram of the pedal travel and the associated pressure illustrating a second exemplary method.

In the first operating mode, i.e. before the switching over into the hydraulic fallback level, the master brake cylinder 12 is connected to the pedal travel simulator 19 and the characteristic curve 40 in FIG. 5 is effective. In accordance with the pedal force applied by the driver, the pressure $P_2$ is therefore present at the master brake cylinder 12 or pedal travel simulator 19, and the pedal travel $S_4$ is present (point 84). Owing to the braking force boosting function of the pressure supply device 4 there is a relatively high (system) pressure level in the brake circuits I, II. At the changeover into the second operating mode $Z_P$, the closing of the valves 20, 27a, 27b and the opening of the isolating valves 14a, 14b cause the brake pedal 1 to be forced back out of its pedal position $S_4$ with a constant pedal force, i.e. the same pressure $P_2$, by the excess volume in the wheel brakes 6 until a corresponding pressure equalization has taken place. This is indicated in FIG. 5 by the arrow 86. The pedal travel $S_5$ is therefore set. At the same time, the piston 22 is returned to its hydraulic zero position by the spring 33. The pressure space 25 is filled here via the non-return valve/suction valve 34.

If the electrical power supply is then restored, in block 53 in FIG. 3 the sensors and the ECU 7 of the brake system are firstly initialized, with the result that measured values of the pressure sensor 15 and measured values of the travel/position sensor 17 are then available again. In block the simulator release valve 20 is also opened again. The valves 14a, 14b, 27a, 27b initially remain currentless.

In block 56, it can be detected, through plausibility checking or a comparison on the basis of the current measured values of the sensors 15 and 17 ($P_{THZ}$ and $S_{Pedal}$) and the characteristic curves 41 and 40 stored in the blocks 54 and 55, respectively, that the point 85 ($S_5$, $P_2$) which is set is above the nominal characteristic curves 40. If this is the case, an active pedal correction, for example by means of the outlet valves 29a-d, is carried out (branch 61 to block 62).

The pedal correction in block 62 occurs for example by the opening of the outlet valves 29a-d which are assigned to the wheel brakes 6. The excess volume which is previously fed in via the wheel brakes 6 is discharged via the outlet valves 29a-d into the pressure medium reservoir container 3 until the pedal travel of the brake pedal 1 corresponds again to the corresponding value $S_4$ of the nominal characteristic curve 40. The activation valves 27a, 27b are also opened in block 62 so that the pressure supply device 4 is connected to the brake circuits I, II.

Figure 6:
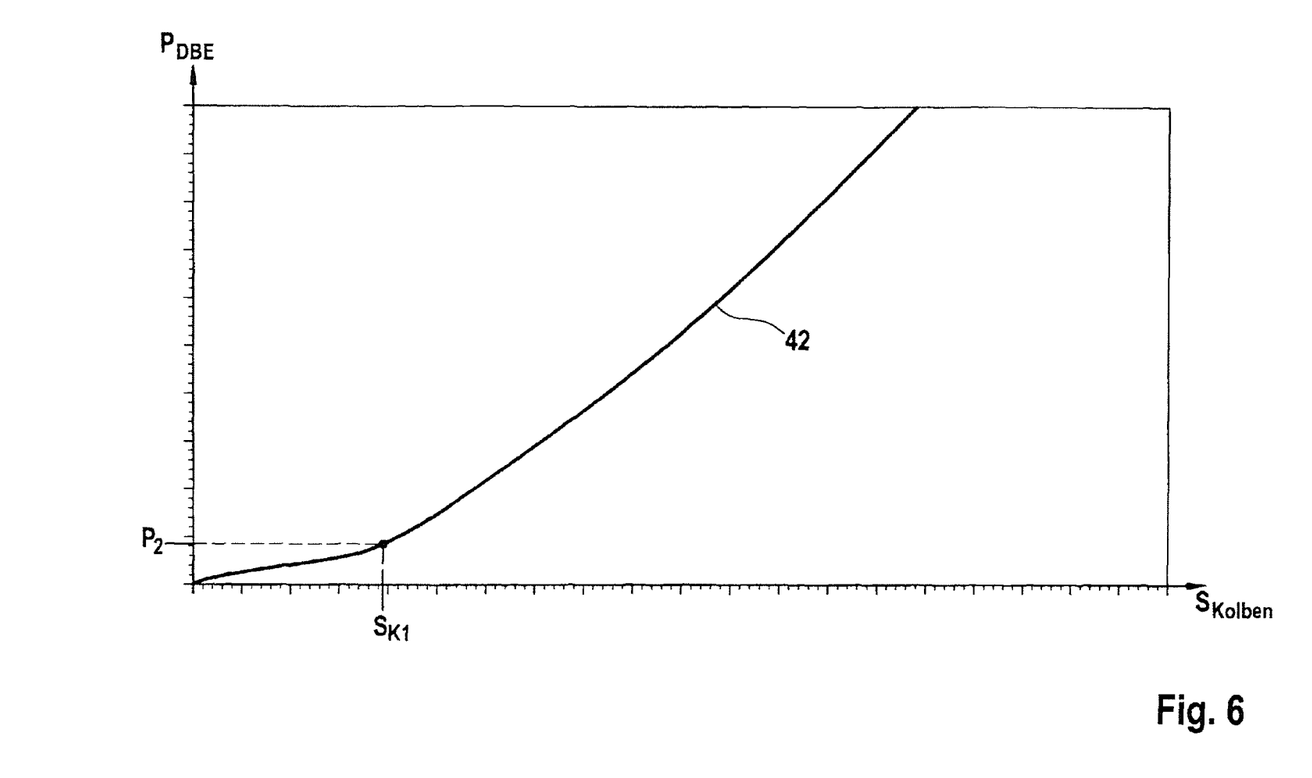
FIG. 6 shows an exemplary characteristic curve of a pressure supply device.

At the same time, the piston 22 of the pressure supply device 4 is set to a piston position $S_{Piston}$ which corresponds to a pressure of the pressure supply device 4 which is equal to the pressure $P_{THZ}$ in the master brake cylinder 12 ($P_{THZ}=P_2$). For this purpose, a pressure/travel characteristic curve 42 of the pressure supply device 4 is stored in the open-loop and closed-loop control unit 7. An exemplary characteristic curve 42 describing the relationship between the piston position $S_{Piston}$ and the pressure $P_{DBE}$ of the pressure supply device 4 is illustrated schematically in FIG. 6. A piston position $S_{K1}$ corresponds to the pressure $P_{DBE}=P_2$. The piston position $S_{Piston}$ can be checked by means of the sensor 24.

Once the pedal correction and setting of the piston 22 are concluded, in block 59 the isolating valves 14a, 14b are closed and then in block 60 the boosting of the braking force is slowly increased in accordance with the driver's request until the brake system is again in the first operating mode $Z_A$ ("brake-by-wire" operating mode with boosting of the braking force).

In addition to the two cases described above (first and second cases), in cases in which the actuation of the brake pedal 1 by the driver is low, no pedal correction is carried out. For this purpose, in block 56 it is checked whether the current pedal travel $S_{Pedal}$ or the current operating point ($S_{Pedal}$, $P_{THZ}$) of the brake system is below a predefined threshold value $S_g$ or inside a predefined characteristic diagram range 44 which is defined, for example, by two threshold valves $S_g$ and $P_g$ (see FIGS. 4 and 5). If the pedal travel $S_{Pedal}$ is below the threshold value $S_g$ or the operating point ($S_{Pedal}$, $P_{THZ}$) is inside the characteristic diagram range 44, the actual pedal travel differs only very slightly or to an acceptable degree from the pedal travel according to the nominal characteristic curve 40. In block 64 the isolating valves 14a, 14b are then closed and the activation valves 27a, 27b opened directly (branch 63 in FIG. 3), without pedal correction. Subsequently, as has already been stated for the first and second cases above, in block 60 the boosting of the braking force is slowly increased by means of the pressure supply device 4. The brake system is then in the first operating mode $Z_A$ ("brake-by-wire" operating mode with boosting of the braking force, normal braking function). After a subsequent release of the brake pedal 1, the brake system then sets itself again to the nominal characteristic curve 40 as a result of the sucking in of the missing (small) volume (via the connection of the pressure chambers 10, 11 to the pressure medium reservoir container 3).

The invention claimed is:

1. A method for operating a brake system for motor vehicles, comprising:
    a master brake cylinder which can be actuated by a brake pedal and which is separably connected to at least one brake circuit (I, II) with at least one hydraulically actuable wheel brake, wherein a first variable ($P_{THZ}$) which characterizes a pressure in the master brake cylinder and a second variable ($S_{Pedal}$) which characterizes an actuation travel of the brake pedal are measured periodically,
    a hydraulically actuable pedal travel simulator which is or can be connected to the master brake cylinder and which is designed so as to be capable of being switched on and off by a simulator release valve,
    an electrically controllable pressure supply device which is separably connected to the brake circuit (I, II) and which is formed by a cylinder-piston arrangement whose piston can be actuated by an electromechanical actuator, and
    an electronic open-loop and closed-loop control unit for activating the electrically controllable pressure supply device and valves of the brake system,
    wherein, when the brake pedal is actuated, in a first operating mode ($Z_A$) the brake circuit (I, II) is provided with a pressure ($P_{Setp}$) of the pressure supply device, and in a second operating mode ($Z_P$) the brake circuit is provided with the pressure ($P_{THZ}$) of the master brake cylinder,
    wherein in a case of a changeover from the second operating mode ($Z_P$) into the first operating mode ($Z_A$) during actuation of the brake pedal from a non-actuated position the actuation travel ($S_{Pedal}$) of the brake pedal is adjusted under electronic open-loop or closed-loop control, and
    wherein a first characteristic curve, which describes a relationship between the first and second variables ($P_{THZ}$, $S_{Pedal}$) in the first operating mode ($Z_A$), and a second characteristic curve which describes a relationship between the first and second variables ($P_{THZ}$, $S_{Pedal}$) in the second operating mode ($Z_P$), are predefined, and wherein comparing the current values of the first and second variables ($P_{THZ}$, $S_{Pedal}$) with the first characteristic curve and/or the second characteristic curve it is decided whether pressure medium will be discharged from or fed into the master brake cylinder.

2. The method as claimed in claim 1, wherein in the case of the changeover from the second operating mode ($Z_P$) into the first operating mode ($Z_A$) during actuation of the brake pedal the actuation travel ($S_{Pedal}$) of the brake pedal is adjusted by discharging a pressure medium, under electronic open-loop or closed-loop control, from the master brake cylinder or by feeding the pressure medium into the master brake cylinder under electronic open-loop or closed-loop control.

3. The method as claimed in claim 1, wherein the actuation travel ($S_{Pedal}$) is reduced by feeding in a pressure medium if a value pair composed of the first and second variables ($S_2$, $P_1$) is below the second characteristic curve after the pedal travel simulator is activated.

4. The method as claimed in claim 1, wherein the actuation travel ($S_{Pedal}$) is increased by discharging a pressure medium if a value pair composed of the first and second variables ($S_5$, $P_2$) is above the first characteristic curve the pedal travel simulator is activated.

5. The method as claimed in claim 1, wherein in the case of the changeover from the second operating mode ($Z_P$) into the first operating mode ($Z_A$), sensors for measuring the first and second variables ($P_{THZ}$, $S_{Pedal}$) are firstly initialized and then the pedal travel simulator is switched on by a simulator release valve, and afterwards the adjustment of the actuation travel ($S_{Pedal}$) of the brake pedal carried out.

6. The method as claimed in claim 1, wherein the actuation travel ($S_{Pedal}$) of the brake pedal is reduced in that an activation valve which is arranged between the pressure supply device and the brake circuit (I, II) is opened, and the pressure supply device is activated in such a way that pressure medium volume is forced into the master brake cylinder.

7. The method as claimed in claim 1, wherein the actuation travel ($S_{Pedal}$) of the brake pedal is increased in that an outlet valve which is arranged between a wheel brake and a pressure medium reservoir container is opened.

8. The method as claimed in claim 7, wherein an activation valve which is arranged between the pressure supply device and the brake circuit (I, II) is opened simultaneously with the increase of the actuation travel ($S_{Pedal}$) of the brake pedal.

9. The method as claimed in claim 1, wherein a case of the changeover the actuation travel ($S_{Pedal}$) of the brake pedal is not adjusted if a current value of the second variable ($S_{Pedal}$) is lower than a predefined first threshold value ($S_g$) and if in addition the current value of the first variable ($P_{THZ}$) is lower than a predefined second threshold value ($P_g$).

10. A method for operating a brake system for motor vehicles, comprising:
    a master brake cylinder which can be actuated by a brake pedal and which is separably connected to at least one brake circuit (I, II) with at least one hydraulically actuable wheel brake, wherein a first variable ($P_{THZ}$) which characterizes a pressure in the master brake cylinder and a second variable ($S_{Pedal}$) which characterizes an actuation travel of the brake pedal are measured periodically,
    a hydraulically actuable pedal travel simulator which is or can be connected to the master brake cylinder and which is designed so as to be capable of being switched on and off by a simulator release valve,
    an electrically controllable pressure supply device which is separably connected to the brake circuit (I, II) and which is formed by a cylinder-piston arrangement whose piston can be actuated by an electromechanical actuator, and an electronic open-loop and closed-loop control unit for activating the electrically controllable pressure supply device and valves of the brake system, wherein, when the brake pedal is actuated, in a first operating mode ($Z_A$) the brake circuit (I, II) is provided with a pressure ($P_{Setp}$) of the pressure supply device, and in a second operating mode ($Z_P$) the brake circuit is provided with the pressure ($P_{THZ}$) of the master brake cylinder, wherein in a case of a changeover from the second operating mode ($Z_P$) into the first operating mode ($Z_A$) during actuation of the brake pedal the actuation travel ($S_{Pedal}$) of the brake pedal is adjusted under electronic open-loop or closed-loop control, wherein a first characteristic curve, which describes a relationship between the first and second variables ($P_{THZ}$, $S_{Pedal}$) in the first operating mode ($Z_A$), and a second characteristic curve which describes a relationship between the first and second variables ($P_{THZ}$, $S_{Pedal}$) in the second operating mode ($Z_P$), are predefined, and wherein comparing the current values of the first and second variables ($P_{THZ}$, $S_{Pedal}$) with the first characteristic curve and/or the second characteristic curve it is decided whether pressure medium will be discharged or fed in, and wherein the actuation travel ($S_{Pedal}$) adjusted to a value ($S_3$, $S_4$) in accordance with the first characteristic curve.

11. A method for operating a brake system for motor vehicles, comprising:

a master brake cylinder which can be actuated by a brake pedal and which is separably connected to at least one brake circuit (I, II) with at least one hydraulically actuable wheel brake, wherein a first variable ($P_{THZ}$) which characterizes a pressure in the master brake cylinder and a second variable ($S_{Pedal}$) which characterizes an actuation travel of the brake pedal are measured periodically, a hydraulically actuable pedal travel simulator which is or can be connected to the master brake cylinder and which is designed so as to be capable of being switched on and off by a simulator release valve, an electrically controllable pressure supply device which is separably connected to the brake circuit (I, II) and which is formed by a cylinder-piston arrangement whose piston can be actuated by an electromechanical actuator, and an electronic open-loop and closed-loop control unit for activating the electrically controllable pressure supply device and valves of the brake system, wherein, when the brake pedal is actuated, in a first operating mode ($Z_A$) the brake circuit (I, II) is provided with a pressure ($P_{Setp}$) of the pressure supply device, and in a second operating mode ($Z_P$) the brake circuit is provided with the pressure ($P_{THZ}$) of the master brake cylinder, wherein in a case of a changeover from the second operating mode ($Z_P$) into the first operating mode ($Z_A$) during actuation of the brake pedal the actuation travel ($S_{Pedal}$) of the brake pedal is adjusted under electronic open-loop or closed-loop control, wherein the actuation travel ($S_{Pedal}$) of the brake pedal is increased in that an outlet valve which is arranged between a wheel brake and a pressure medium reservoir container is opened, wherein an activation valve which is arranged between the pressure supply device and the brake circuit (I, II) is opened simultaneously with the increase of the actuation travel ($S_{Pedal}$) of the brake pedal, and wherein simultaneously with the actuation of the piston of the cylinder-piston arrangement by the electromechanical actuator, the piston is set to a piston position ($S_{K1}$) which is predetermined according to a predefined piston position pressure characteristic curve.

12. A method for operating a brake system for motor vehicles, comprising:

a master brake cylinder which can be actuated by a brake pedal and which is separably connected to at least one brake circuit (I, II) with at least one hydraulically actuable wheel brake, wherein a first variable ($P_{THZ}$) which characterizes a pressure in the master brake cylinder and a second variable ($S_{Pedal}$) which characterizes an actuation travel of the brake pedal are measured periodically, a hydraulically actuable pedal travel simulator which is or can be connected to the master brake cylinder and which is designed so as to be capable of being switched on and off by a simulator release valve, an electrically controllable pressure supply device which is separably connected to the brake circuit (I, II) and which is formed by a cylinder-piston arrangement whose piston can be actuated by an electromechanical actuator, and an electronic open-loop and closed-loop control unit for activating the electrically controllable pressure supply device and valves of the brake system, wherein, when the brake pedal is actuated, in a first operating mode ($Z_A$) the brake circuit (I, II) is provided with a pressure ($P_{Setp}$) of the pressure supply device, and in a second operating mode ($Z_P$) the brake circuit is provided with the pressure ($P_{THZ}$) of the master brake cylinder, and wherein in a case of a changeover from the second operating mode ($Z_P$) into the first operating mode ($Z_A$) during actuation of the brake pedal from a non-actuated position the actuation travel ($S_{Pedal}$) of the brake pedal is adjusted under electronic open-loop or closed-loop control, and wherein after the adjustment of the actuation travel ($S_{Pedal}$) of the brake pedal an isolating valve which is arranged between the master brake cylinder and the brake circuit (I, II) is closed, and then a predetermined setpoint pressure ($P_{Setp}$) is set by the pressure supply device, which setpoint pressure ($P_{Setp}$) is determined on the basis of the current values of the first and second variables ($P_{THZ}$, $S_{Pedal}$).

13. A brake system for motor vehicles, comprising a master brake cylinder which can be actuated by a brake pedal and which is separably connected to at least one brake circuit (I, II) with at least one hydraulically actuable wheel brake, a measuring device for determining a first variable ($P_{THZ}$) which characterizes a pressure in the master brake cylinder, and a measuring device for determining a second variable ($S_{Pedal}$) which characterizes an actuation travel of the brake pedal, a hydraulically actuable pedal travel simulator which is or can be connected to the master brake cylinder and which is designed so as to be capable of being switched on and off by means of a simulator release valve, an electrically controllable pressure supply device which is separably connected to the brake circuit (I, II) and which is formed by a cylinder-piston arrangement whose piston can be actuated by an electromechanical actuator, a wheel brake pressure modulation unit which has, per wheel brake, an inlet valve and an outlet valve for setting a wheel-specific brake pressure which is derived from the pressure in the brake circuit (I, II), and an electronic open-loop and closed-loop control unit for activating the electrically controllable pressure supply device and valves of the brake system, wherein in a first operating mode ($Z_A$) when the brake pedal is actuated a pressure ($P_{Setp}$) of the pressure supply device is applied to the brake circuit (I, II), and wherein in a second operating mode ($Z_P$) when the brake pedal is actuated the pressure ($P_{THZ}$) of the master brake cylinder is applied to the brake circuit (I, II), wherein in a case of a changeover from the second operating mode ($Z_P$) into the first operating mode ($Z_A$) during actuation of the brake pedal from a non-actuated position the open-loop and closed-loop control unit carries out adjustment of the actuation travel ($S_{Pedal}$) of the brake pedal, and wherein a first characteristic curve, which describes a relationship between the first and second variables ($P_{THZ}$, $S_{Pedal}$) the first operating mode ($Z_A$), and a second characteristic curve which describes a relationship between the first and second variables ($P_{THZ}$, $S_{Pedal}$) in the second operating mode ($Z_P$), are predefined and wherein comparing the current values of the first and second variables ($P_{THZ}$, $S_{Pedal}$) with the first characteristic curve and/or the second characteristic curve by the open-loop and closed-loop control unit it is decided whether pressure medium will be discharged from or fed into the master brake cylinder.

14. A brake system having an electronic open-loop and closed-loop control unit, comprising a master brake cylinder which can be actuated by a brake pedal and which is separably connected to at least one brake circuit (I, II) with at least one hydraulically actuable wheel brake, a measuring device for determining a first variable ($P_{THZ}$) which characterizes a pressure in the master brake cylinder, and a measuring device for determining a second variable ($S_{Pedal}$) which characterizes an actuation travel of the brake pedal, a hydraulically actuable pedal travel simulator which is or can be connected to the master brake cylinder and which is designed so as to be capable of being switched on and off by means of a simulator release valve, an electrically controllable pressure supply device which is separably connected to the brake circuit (I, II) and which is formed by a cylinder-piston arrangement whose piston can be actuated by an electromechanical actuator, a wheel brake pressure modulation unit which has, per wheel brake, an inlet valve and an outlet valve for setting a wheel-specific brake pressure which is derived from the pressure in the brake circuit (I, II), and an electronic open-loop and closed-loop control unit for activating the electrically controllable pressure supply device and valves of the brake system, wherein in a first operating mode ($Z_A$) when the brake pedal is actuated a pressure ($P_{Setp}$) of the pressure supply device is applied to the brake circuit (I, II), and wherein in a second operating mode ($Z_P$) when the brake pedal is actuated the pressure ($P_{THZ}$) of the master brake cylinder is applied to the brake circuit (I, II), wherein in a case of a changeover from the second operating mode ($Z_P$) into the first operating mode ($Z_A$) during actuation of the brake pedal from a non-actuated position the open-loop and closed-loop control unit carries out adjustment of the actuation travel ($S_{Pedal}$) of the brake pedal, and wherein the electronic open-loop and closed-loop control unit carries out the method of claim 1.

* * * * *